US010356337B2

(12) United States Patent
Biemer (10) Patent No.: US 10,356,337 B2
(45) Date of Patent: Jul. 16, 2019

(54) VEHICLE VISION SYSTEM WITH GRAY LEVEL TRANSITION SENSITIVE PIXELS

(71) Applicant: MAGNA ELECTRONICS INC., Auburn Hills, MI (US)

(72) Inventor: Michael Biemer, Aschaffenburg-Obernau (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 824 days.

(21) Appl. No.: 14/875,965

(22) Filed: Oct. 6, 2015

(65) Prior Publication Data

US 2016/0096477 A1 Apr. 7, 2016

Related U.S. Application Data

(60) Provisional application No. 62/089,542, filed on Dec. 9, 2014, provisional application No. 62/082,637, filed on Nov. 21, 2014, provisional application No. 62/064,146, filed on Oct. 15, 2014, provisional application No. 62/060,812, filed on Oct. 7, 2014.

(51) Int. Cl.
| | |
|---|---|
| *H04N 5/247* | (2006.01) |
| *G06K 9/00* | (2006.01) |
| *G06K 9/52* | (2006.01) |
| *H04N 5/225* | (2006.01) |
| *H04N 5/369* | (2011.01) |

(52) U.S. Cl.
CPC ......... *H04N 5/247* (2013.01); *G06K 9/00791* (2013.01); *G06K 9/00805* (2013.01); *G06K 9/52* (2013.01); *H04N 5/2258* (2013.01); *H04N 5/3696* (2013.01)

(58) Field of Classification Search
CPC ...................................................... H04N 5/247
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |

(Continued)

OTHER PUBLICATIONS

Posh, Christoph, "Next Generation Bio-inspired Vision", https://ercim-news.ercim.eu/en84/special/next-generation-bio-inspired-vision, Jan. 11, 2011.

*Primary Examiner* — James M Pontius
(74) *Attorney, Agent, or Firm* — Honigman LLP (57) ABSTRACT

A vision system of a vehicle includes at least one camera disposed at a vehicle and having a field of view exterior of the vehicle. The camera has at least one pixelated imaging array having a plurality of photosensing elements. The pixelated imaging array includes a plurality of event-based gray level transition sensitive photosensing elements. A processor is operable to process data captured by the camera and, responsive to processing of captured data, the processor is operable to detect objects present in the field of view of the camera. The pixelated imaging array may include a first imaging array having visible light sensitive photosensing elements and a second imaging array having the plurality of event-based gray level transition sensitive photosensing elements.

19 Claims, 5 Drawing Sheets

(56) References Cited

U.S. PATENT DOCUMENTS

| | | |
|---|---|---|
| 5,929,786 A | 7/1999 | Schofield et al. |
| 5,949,331 A | 9/1999 | Schofield et al. |
| 6,201,642 B1 | 3/2001 | Bos |
| 6,222,447 B1 | 4/2001 | Schofield et al. |
| 6,302,545 B1 | 10/2001 | Schofield et al. |
| 6,396,397 B1 | 5/2002 | Bos et al. |
| 6,498,620 B2 | 12/2002 | Schofield et al. |
| 6,523,964 B2 | 2/2003 | Schofield et al. |
| 6,611,202 B2 | 8/2003 | Schofield et al. |
| 6,636,258 B2 | 10/2003 | Strumolo |
| 6,690,268 B2 | 2/2004 | Schofield et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,882,287 B2 | 4/2005 | Schofield |
| 6,891,563 B2 * | 5/2005 | Schofield ............... B60R 1/00 348/143 |
| 6,946,978 B2 | 9/2005 | Schofield |
| 7,005,974 B2 | 2/2006 | McMahon et al. |
| 7,038,577 B2 | 5/2006 | Pawlicki et al. |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 7,881,496 B2 | 2/2011 | Camilleri et al. |
| 8,446,470 B2 | 5/2013 | Lu et al. |
| 2005/0111698 A1 * | 5/2005 | Kawai ............... B60R 1/00 382/103 |
| 2014/0168415 A1 | 6/2014 | Ihlenburg et al. |
| 2015/0156383 A1 | 6/2015 | Biemer et al. |
| 2015/0344028 A1 | 12/2015 | Gieseke et al. |

\* cited by examiner

VEHICLE VISION SYSTEM WITH GRAY LEVEL TRANSITION SENSITIVE PIXELS

CROSS REFERENCE TO RELATED APPLICATIONS

The present application is related to U.S. provisional applications, Ser. No. 62/089,542, filed Dec. 9, 2014, Ser. No. 62/082,637, filed Nov. 21, 2014, Ser. No. 62/064,146, filed Oct. 15, 2014, and Ser. No. 62/060,812, filed Oct. 7, 2014, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, with the camera or cameras having at least one sensing array comprising image vision pixels or IV pixels and event-based gray level transition sensitive pixels or dynamic vision sensor (DVS) pixels. The camera may include two arrays, one with IV pixels and one with DVS pixels, and may have a single lens or optic or lens system at the arrays, or the camera may include a single array, with different types of pixels or with different processing of pixels outputs.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
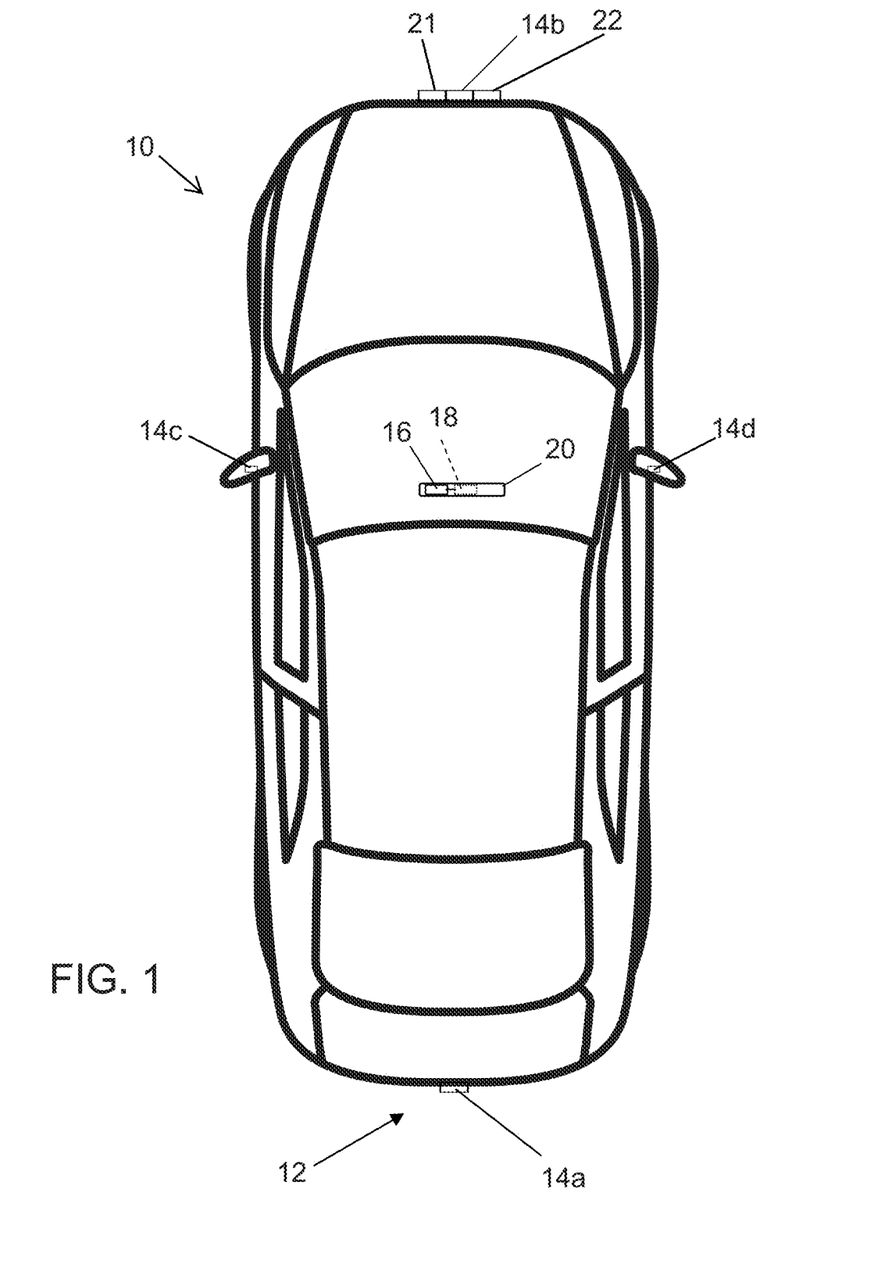
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, the imaging system 12 may include a forwardly facing relative gray level transitions sensitive camera 21 and optionally a LASER 21. The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle) and may provide information about the clearance in front of the vehicle. The data transfer or signal communication from the camera to the ECU may comprise any suitable data or communication link, such as a vehicle network bus or the like of the equipped vehicle.

The Austrian Institute of Technology (AIT) has developed an imager that is sensitive to relative gray level transitions. When a pixel's transition rate exceeds a threshold, an event is triggered and the threshold changes or increases. When the next threshold is reached another event is triggered. This pixel-wise functionality is imager inherent. The imager ATIS—304×240 pixel array DVS has no color filter and works in a spectral band or range that includes infrared wavelengths. The imager is well suitable for pre-processing differences from motion. By that it can well detect the motion flow of a scene outside a vehicle at which a camera with such a sensor is mounted.

Because the ATIS—304×240 pixel array DVS has no frame-based image vision pixels (hereinafter referred as image vision or IV pixels) but just event-based gray level transition sensitive pixels (hereinafter referred to as DVS pixels), there is no vision image output at such a sensor.

The present invention provides a camera that combines an infrared (IR) and/or near infrared and/or visible wavelength sensitive or IV pixel imager or sensing array with a gray level transition sensitive DVS pixel imager or sensing array. The vision system includes a processor that processes data captured by both sensing arrays to enhance detection of objects present in the field of view of the camera, such as objects that are moving relative to the camera and vehicle equipped with the camera or cameras.

Figure 2:
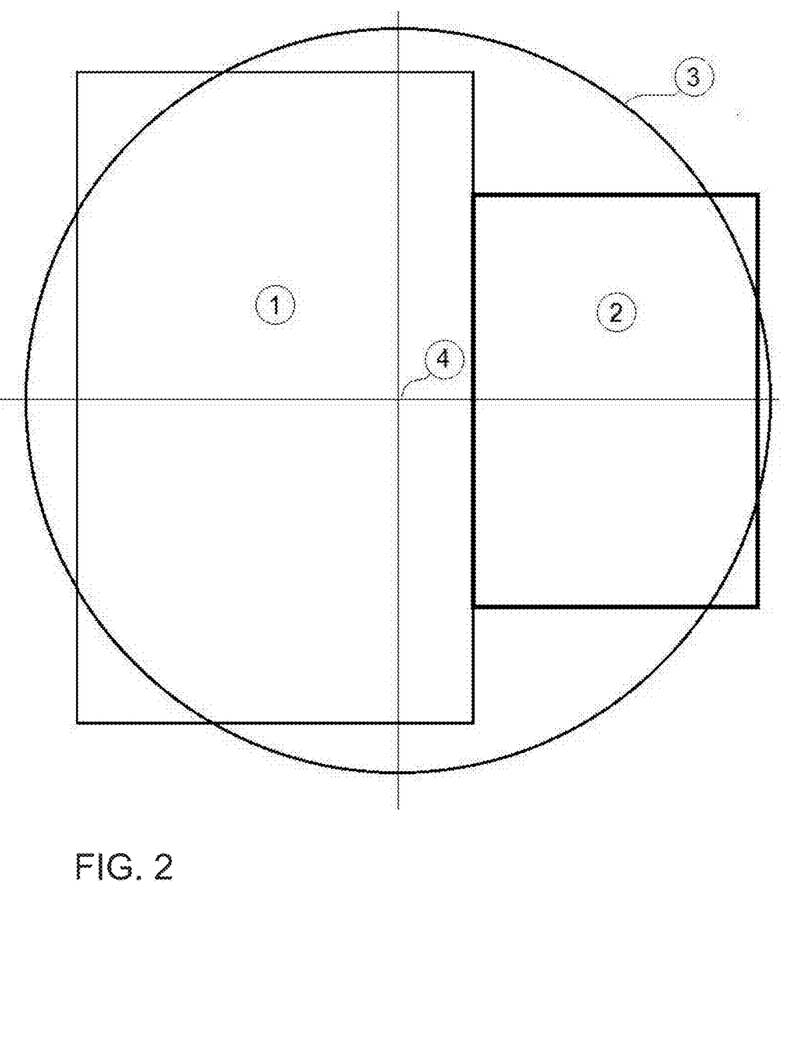
FIG. 2 is a schematic showing a camera with an image vision pixel array and a gray level transition sensitive pixel array, with a lens.

Optionally, the camera system according to the present invention may have two independent optical systems for the IV pixel imager and the DVS pixel imager or sensing array. Optionally, and as shown in FIG. 2, the camera may comprise two imagers, one imager or sensing array comprising IV pixels and another imager or sensing array comprising DVS pixels, arranged side by side and sharing the same optical system, such as shown in FIG. 2. The example in FIG. 2 shows a vehicle side view camera which may be part of a rear and bind spot detection system or surround view vision system with one optic having the projection circle 3. The center of the optics is 4. The camera includes an IV imager or sensing array 1 and a DVS imager or sensing array 2. The imagers 1, 2 may comprise pixelated arrays of rows and columns of photosensors established on a single or common semiconductor substrate or the like, and the circuitry may also be established on the common semiconductor substrate.

As a second option, the camera may have two imagers or sensing arrays, one with IV pixels and one with DVS pixels, side by side at the same device.

Optionally, the vision system's optic may have a prismatic image splitter for projecting the image to each imager's position. Optionally, different wavelengths may be split as well, such as splitting infrared wavelengths of light from visual wavelengths of light.

As a third option, the camera may have an imager or sensing array with both IV pixels and DVS pixels combined in a pattern on one device.

As a derivate of the third option, the camera may have an imager with both IV pixels and DVS pixels combined in a pattern on one dice and having a multi lens array, such as comprising a light field camera. For example, the camera may utilize aspects of the cameras and imagers described in U.S. Publication No. US-2014-0168415, which is hereby incorporated herein by reference in its entirety.

As a fourth option, the camera may have an imager with IV pixels and DVS pixels comprised in common pixel circuits, so that each pixel of the sensing array outputs a frame-based visual image value and also outputs (such as at a different time) gray level transitions events. The outputs may be synchronized or asynchronous to one another at each pixel and/or frame.

The imager of the present inventions is suitable for automotive forward vision cameras, rear vision cameras, side cameras or in cabin cameras. The cameras may be part of a top view or surround view vision system (SVS) or blind spot vision system or panorama vision system or rear view vision system or the like. The lens systems used with the cameras may be normal, fish eye or high distortion lens.

As a specific exemplary application, in-cabin DVS imagers of an eye gaze detection system (such as, for example, an in-cabin eye gaze detection system) may detect the eye lid closing of a driver for retracking the eye ball after blinking, where during such times the iris is invisible. Optionally, the eye cascades may also be tracked under the use of a DVS imager. Each cascade may trigger threshold events on the borderline of sclera and iris, and optionally on the borderline of pupil and iris. As another application, DVS cameras may come into use for detecting road surface properties, such as dry concrete, sand, ice, snow, wet asphalt and/or the like, by a surface pattern. The detection may be based on frequency analysis or on the reciprocal time domain, where a temporal pattern may be compared to a known pattern's database.

As another application, DVS cameras may come into use for in cabin driver or passenger gesture recognition. For example, when using stereo vision or temporal plausibilization, the gestures done by hand may be well distinguishable from light patterns (such as shades gliding over the car) from hand movements.

Optionally, a system of the present invention may use DVS sensors or optionally sensors in combination with vision sensors for light and/or infrared light based data communication by digitally coded data transmission. These sensors are well suited for this duty because of their high dynamic range and event-based detection behavior. By that the Nyquist frequency is not limited to the half frame sample frequency, but just to the half of the reciprocal of the minimal time between pixel trigger events. The sending device or transmitting device may comprise a bright Laser LED in a wavelength suitable to the sensitive wavelengths of the DVS sensor. The LED may be well trackable against the environmental motion noise by temporal filtering the sending pattern against the stochastic noise. Optionally, a specific wavelength may be used on the sending side with a small band wavelengths filter on the receiving side to further increase the signal to noise ratio (SNR).

Since IV imagers typically have a fixed, often comparably low, sample frequency, such as about 60 Hz, flicker lights such as other vehicle's tail or head light LEDs, which may flicker in a frequency of about 200 Hz, may cause disturbing effects such as 'pearl cord effect' or aliasing, which are hard to compensate without additional sensors or sophisticated high dynamic range (HDR) shuttering. As an optional approach, the LED flickering frequency may be detected by temporal filtering of the DVS sensor for correcting aliasing or subsampling ghost patterns in a visual image for human and machine vision processing.

Figure 3:
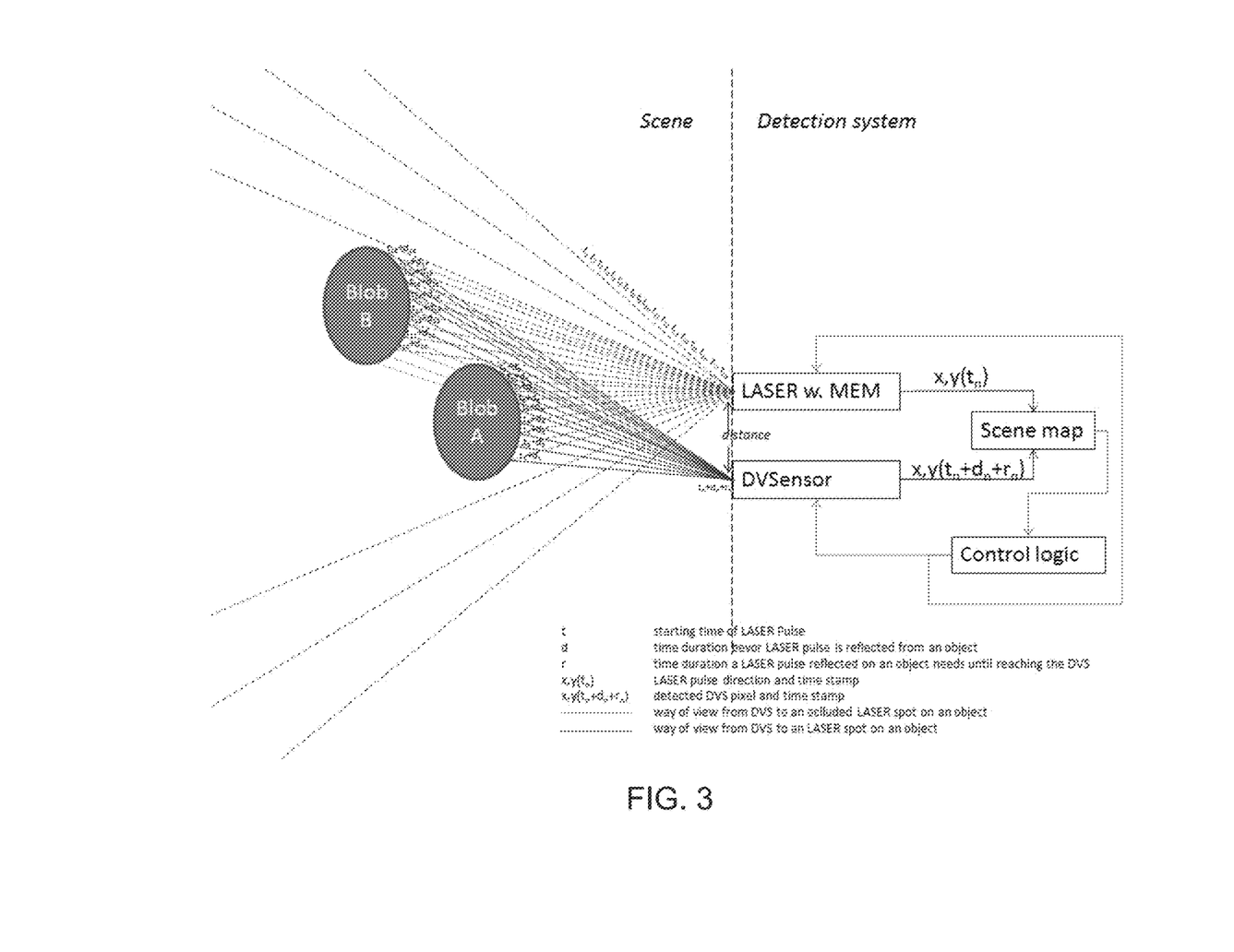
FIG. 3 is a schematic showing the operation of a laser and DV sensor in accordance with the present invention.

By combining the DVS camera 21 with a LASER 22 of suitable wavelengths such a near infrared or infrared (IR) of around 905 nm (typically for a LASER with an InGaAs/GaAs crystal, such as, for example, a SPL PL90_3 LASER diode with 75 W peak) controlled to emit intensive pulses, the gray level transition image captured by the DVS may serve as ranging detection. Similar to a time of flight (TOF) sensor, the time $(t_n+d_n+r_n)$ from emitting the LASER $(t_n)$ plus the time the light takes until being reflected off of an object's surface $(d_n)$ plus the time $(r_n)$ the light takes until being received or detected by a detector (such as the DVS imager's pixel) tells about the absolute distance of one or more (reflecting) object(s), see FIG. 3. Different from known art TOF systems which use photonic mixer devices (PMDs) for detecting the reflected LASER light, a DVS can detect each single LASER pulse reflection in visible distance independently since not image frames but pixel gray level transition events become detected. By that there may be many pixels detected in a short duration such as one per 10 ns.

LIDARS typically have a rotating mirror drawing a continuous LASER line in one horizontal layer. Advanced LIDAR use micro mechanical mirrors (MEM) which can be tuned in two directions. Such scanner have a typical scanning frequency of about 250 Hz. The Osram® SPL PL90 has a pulse width of 100 ns and a duty cycle of 0.1%. By that it can fire 40 pulses within one sweep which takes 4 ms. Since the laser pulse is comparably short but very intensive, the sensitivity threshold of the DVS pixel may be tuned to be comparably less sensitive. That means the threshold levels of single or alternatively all pixels may be controlled higher (than to detect normal daylight edge transitions). At the same time pixel noise can be reduced by temporarily filtering.

Only pixels which detect a positive transition within about 10 ms (when the maximum range may be about 1500 m) may not be filtered.

Additionally, there may be a limited plausible area a ranging pixel dot possibly could appear within the two dimensional (2D) DVS imager area. Only these pixels may be detected. Since the DVS can detect both positive and also negative gray level transitions, the spot at which a light spot disappears can also be detected. By that, the amount of test points within one sweep is about 80 (two at each of about 40 LASER pulses) using the SPL PL90. The LASER direction (its MEM position) may progress between the pulse beginning and ending. By that, the LASER may draw a short line within the 100 ns pulse when the device is active. For additional LASER spot plausification, further methods may come into use such as LASER phase indexing or modulation, LASER polarization indexing or modulation by using a tunable polarization filter or time wise indexing of the LASER by using a fast shutter.

The LASER with MEM may have a repeated 2D (x, y) measuring sweep. For measuring on a dedicated spot, the LASER may be controlled to fire (or disappear as discussed above) in timely fashion just at that moment that the LASER sweeps over that dedicated spot. The sweeping region may be tunable to sweep over a smaller area (x, y area), by that spots within this area can be measured more often within the same timeframe. Optionally, additionally or alternatively, the MEM may be controllable fully independently to any direction, by that any desired spot may be measurable.

Optionally, the distance between the LASER and DVS may additionally or alternatively serve to detect object's distance or to plausibilize the distance by disparity ranging. One advanced method of disparity ranging using a LASER and a light detector is STRUCTURED LIGHT. The LASER may be controlled to generate a structured light pattern. The Control logic may process the direction in which the LASER is fired and the direction in which the DVS detects the light dot. Since the DVS's resolution is comparably low, disparity ranging is less accurate as compared to TOF.

Figure 4:
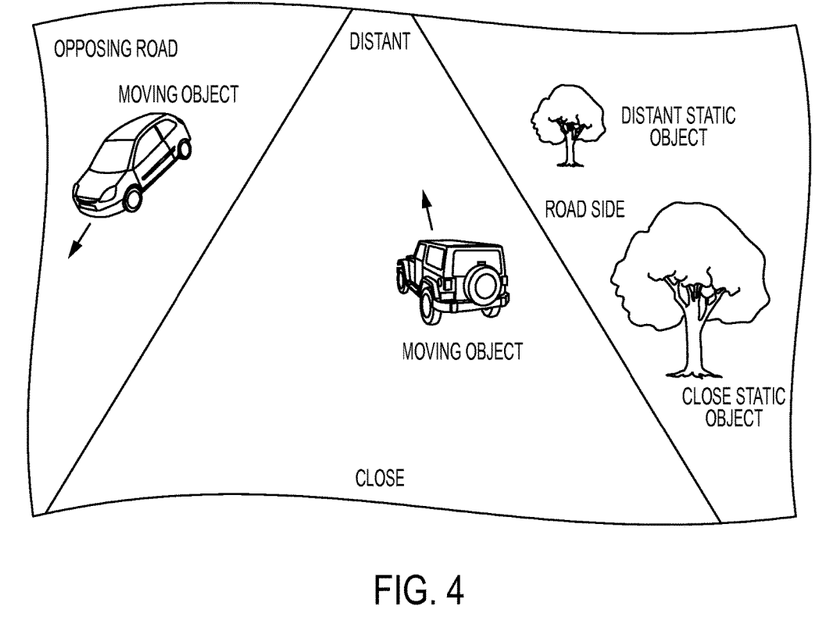
FIG. 4 is a schematic of gray level image captured by the DV sensor of the vision system of the present invention.
Figure 5:
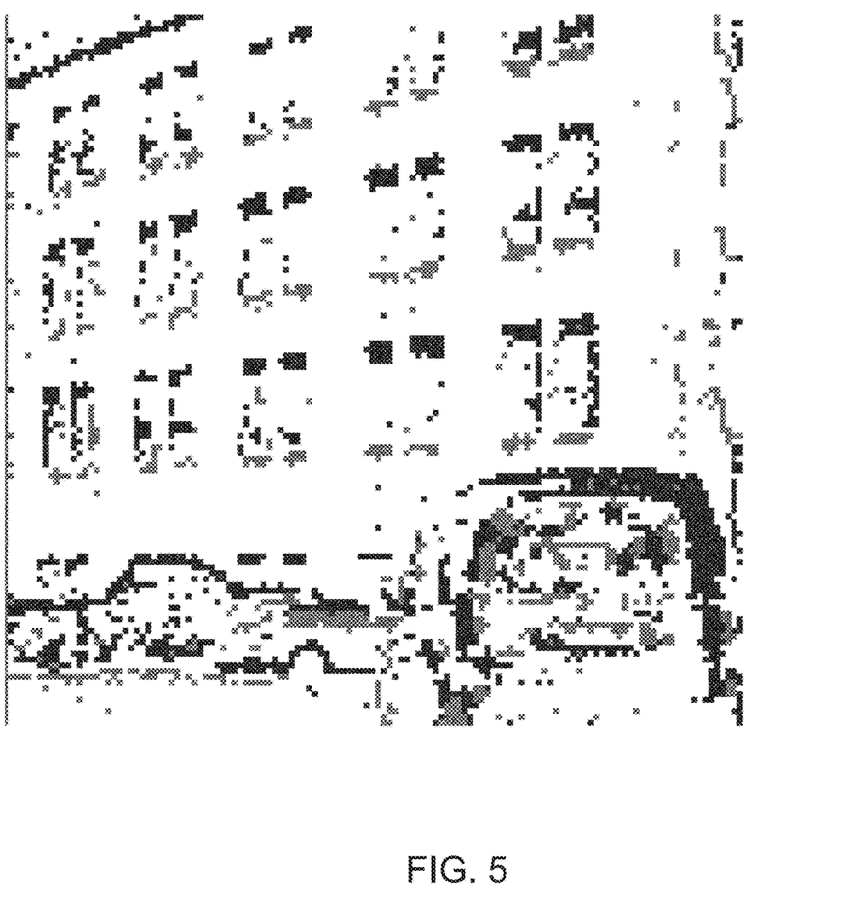
FIG. 5 is a gray level image captured by the DV sensor of the vision system of the present invention.

Since the DVS is delivering a gray level transition image when tuned into 'normal' thresholds, a forward vision scene, especially a road scene with traffic participants, pedestrians, road obstacles and road boundaries in front (and the own vehicle in motion will) become visible in the gray level transition image, such as shown schematically in FIG. 4. An image captured by a DVS imager is shown in FIG. 5. Due to the parallax, the area close by scrolls faster through the gray level transition image than more distant areas. Since every transition edge scrolling through the scene triggers each pixel at least once when the transition is positive and another time when the transition is negative, there is a relation between relative motion (of any kind) speed and density between positive and negative pixel transitions. The rate of density is usable as a rate for motion relative to structure within the scene in front, especially the ego motion (motion of the equipped vehicle). Objects with no speed, so stationary objects or (statically) elements of the road, will all have the same parallax scrolling speed. Translating this to a color or gray level (for keeping it printable on black and white), a low motion may be brighter or more bluish, a fast motion may be darker or more reddish (going from the blue side of the color spectrum to the red side). Structure's transition edges pixels which have much different brightness (or color) compared to its background (or underground) may be segmented and postulated by the processor or processing system as belonging to one single object having potentially a structural component off the ground (Z component) or being in motion itself. By that, these objects/segments are regions/objects of interest, which may be used in an object detection and scene understanding system, optionally redundant to another optical object detection and classification system, such as a visual or infrared wavelength system, for which captured image data is processed by an EyeQ2 or EyeQ3 image processing chip available from Mobileye Vision Technologies Ltd. of Jerusalem, Israel, or by a scene understanding and classification system (such as by utilizing aspects of the systems described in U.S. patent application Ser. No. 14/726,906, filed Jun. 1, 2015, which is hereby incorporated herein by reference in its entirety), which is optionally employing visual and non-visual (ranging) sensors, such as ultrasound or ultrasonic sensors and RADAR in fusion.

The present invention provides a system combined with a LASER scanner as suggested above. That ranging LASER may be controlled to spot the distance of region segment postulated as being objects of interest. Optionally, the LASER may be controlled to scan a limited region of interest by using a limited sweeping area enclosing that region. The control may aim to ensure the postulation was true. The control may aim to dedicate more precise the borderlines of a (newly detected) objects. Known objects may be mapped and actively tracked within a scene map. There may be a repeatedly spotting onto the known objects to verify the postulated direction and speed of the objects, especially for detecting abrupt changes. The control may bestow a dedicated, possibly majoritarian portion of ranging shots to scan newly, unknown scene segments or segments which are from higher interest since these or on a collision path or such.

Different visual sensors and scene classification and mapping algorithm may be employed to verify the detected scene map, such as similar to the above.

Since the above suggested DVS has typically a comparably low amount of pixels, such as, for example, an array of about 304×240 pixels, the imager's resolution may be the limiting factor for the LASER ranging system's detection range. Optionally, the system of the present invention may use electrically controllable liquid lens systems (such as by utilizing aspects of the systems described in U.S. Publication No. US-2015-0156383, which is hereby incorporated herein by reference in its entirety) for the light detecting system. The liquid lenses may be controllable in view direction and optionally also in focus. Due to that property of the liquid lens, the total lens system's focal lens may be chosen longer than usual (such as, for example, about 120 mm instead of only about 50 mm) while maintaining the desired or appropriate field of view. To achieve that, the direction of the detection view may sweep over the field of view (FOV). That may appear in a periodic sweep when operating 'normally' over the whole FOV range (such as a range of, for example, about 40 degrees by about 30 degrees). When 'range detecting', the viewing direction may be controlled into the viewing area in which the LASER dot or spot is supposed to appear. For calculating the dot's x, y position, the view direction vector may be added to the x, y vector of the dot's position in the image.

The camera or sensor may utilize aspects of any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication Nos. US-2010-0020170 and/or US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication Nos. US-2006-0061008 and/or US-2010-0097469, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   at least one camera configured to be disposed at a vehicle so as to have a field of view exterior of the vehicle;
   wherein said at least one camera comprises at least one pixelated imaging array having a plurality of photosensing elements;
   wherein said at least one pixelated imaging array comprises a plurality of event-based gray level transition sensitive photosensing elements;
   a processor operable to process data captured by said at least one camera;
   wherein, responsive to processing of captured data, said processor is operable to detect objects present in the field of view of said at least one camera; and
   wherein said at least one pixelated imaging array comprises a first imaging array comprising visible light sensitive photosensing elements and a second imaging array comprising said plurality of event-based gray level transition sensitive photosensing elements.

2. The vision system of claim 1, wherein said at least one camera comprises at least one lens that images onto said first and second imaging arrays, and wherein said first imaging array comprises a two dimensional array having multiple rows and columns of visible light sensitive photosensing elements and wherein said second imaging array comprises a two dimensional array having multiple rows and columns of event-based gray level transition sensitive photosensing elements.

3. A vision system for a vehicle, said vision system comprising:
   at least one camera configured to be disposed at a vehicle so as to have a field of view exterior of the vehicle;
   wherein said at least one camera comprises at least one pixelated imaging array having a plurality of photosensing elements;
   wherein said at least one pixelated imaging array comprises a plurality of event-based gray level transition sensitive photosensing elements;
   a processor operable to process data captured by said at least one camera;
   wherein, responsive to processing of captured data, said processor is operable to detect objects present in the field of view of said at least one camera; and
   wherein said at least one pixelated imaging array comprises a plurality of visible light sensitive photosensing elements and wherein said visible light sensitive photosensing elements and said event-based gray level transition sensitive photosensing elements are part of a common pixelated imaging array.

4. The vision system of claim 3, wherein said visible light sensitive photosensing elements and said event-based gray level transition sensitive photosensing elements are established at said common pixelated imaging array in respective patterns of photosensing elements.

5. The vision system of claim 3, wherein said visible light sensitive photosensing elements and said event-based gray level transition sensitive photosensing elements comprise common photosensor elements, and wherein outputs of said common photosensor elements are processed via a first processing that processes said common photosensor elements as visible light sensitive photosensing elements and a second processing that processes said common photosensor elements as event-based gray level transition sensitive photosensing elements.

6. The vision system of claim 1, comprising a light emitter that emits pulses of infrared or near infrared light, and wherein said event-based gray level transition sensitive photosensing elements of said at least one pixelated imaging array sense the emitted infrared or near infrared light reflected off objects in the field of view of said at least one camera, and wherein said processor processes captured image data to determine distances to objects present in the field of view of said at least one camera.

7. The vision system of claim 3, wherein said at least one camera comprises a lens that images onto said common pixelated imaging array.

8. The vision system of claim 1, wherein said at least one camera comprises a plurality of cameras configured to be disposed at a vehicle so as to have respective fields of view exterior of the vehicle, and wherein each of said cameras comprises at least one pixelated imaging array having a plurality of photosensing elements comprising a plurality of event-based gray level transition sensitive photosensing elements, and wherein said processor is operable to process data captured by said cameras to detect objects present in the fields of view of said cameras.

9. A vision system for a vehicle, said vision system comprising:
   a plurality of cameras configured to be disposed at a vehicle so as to have respective fields of view exterior of the vehicle;
   wherein each of said cameras comprises at least one pixelated imaging array having a plurality of photosensing elements comprising a plurality of event-based gray level transition sensitive photosensing elements;
   wherein said at least one pixelated imaging array of each of said cameras comprises a plurality of visible light sensitive photosensing elements;
   a processor operable to process data captured by said at bast one camcra said plurality of cameras; and
   wherein, responsive to processing of captured data, said processor is operable to detect objects present in the fields of view of said cameras.

10. The vision system of claim 9,
    wherein said plurality of cameras includes (i) a rearward camera configured to be disposed at a rear portion of the vehicle so as to view rearwardly of the vehicle, (ii)

a left side camera configured to be disposed at a left side of the vehicle and (iii) a right side camera configured to be disposed at a right side of the vehicle.

11. The vision system of claim 8, wherein said cameras include a forward viewing camera configured to be disposed at so as to view through a windshield of the vehicle.

12. A vision system of a vehicle, said vision system comprising:
   a plurality of cameras configured to be disposed at a vehicle so as to have respective fields of view exterior of the vehicle;
   wherein at least one camera of said plurality of cameras comprises a first imaging array comprising a plurality of visible light sensitive photosensing elements and a second imaging array comprising a plurality of event-based gray level transition sensitive photosensing elements;
   a processor operable to process data captured by said at least one camera; and
   wherein, responsive to processing of captured data, said processor is operable to detect objects present in the field of view of said at least one camera.

13. The vision system of claim 12, wherein said at least one camera comprises at least one lens that images onto said first and second imaging arrays.

14. The vision system of claim 12, wherein each of said plurality of cameras comprises a first imaging array comprising a plurality of visible light sensitive photosensing elements and a second imaging array comprising a plurality of event-based gray level transition sensitive photosensing elements, and wherein said processor is operable to process data captured by each of said cameras to detect objects present in the fields of view of said cameras.

15. The vision system of claim 14, wherein said plurality of cameras includes a rearward camera configured to be disposed at a rear portion of the vehicle so as to view rearwardly of the vehicle, a left side camera configured to be disposed at a left side of the vehicle and a right side camera configured to be disposed at a right side of the vehicle.

16. The vision system of claim 14, wherein said plurality of cameras includes a forward viewing camera configured to be disposed at so as to view through a windshield of the vehicle.

17. A vision system of a vehicle, said vision system comprising:
   a plurality of cameras configured to be disposed at a vehicle so as to have respective fields of view exterior of the vehicle, wherein said plurality of cameras includes at least one of (i) a rearward camera configured to be disposed at a rear portion of the vehicle so as to view rearwardly of the vehicle and (ii) a forward camera configured to be disposed at the vehicle so as to view forwardly of the vehicle;
   wherein at least one camera of said plurality of cameras comprises at least one pixelated imaging array having a plurality of photosensing elements;
   wherein said at least one pixelated imaging array comprises a plurality of visible light sensitive photosensing elements and a plurality of event-based gray level transition sensitive photosensing elements;
   wherein said visible light sensitive photosensing elements and said event-based gray level transition sensitive photosensing elements are part of a common pixelated imaging array;
   a processor operable to process data captured by said at least one camera; and
   wherein, responsive to processing of captured data, said processor is operable to detect objects present in the field of view of said at least one camera.

18. The vision system of claim 17, wherein said visible light sensitive photosensing elements and said event-based gray level transition sensitive photosensing elements are established at said common pixelated imaging array in respective patterns of photosensing elements, and wherein said visible light sensitive photosensing elements and said event-based gray level transition sensitive photosensing elements comprise common photosensor elements, and wherein outputs of said common photosensor elements are processed via a first processing that processes said common photosensor elements as visible light sensitive photosensing elements and a second processing that processes said common photosensor elements as event-based gray level transition sensitive photosensing elements.

19. The vision system of claim 17, wherein each of said plurality of cameras comprises said at least one pixelated imaging array comprising a plurality of visible light sensitive photosensing elements and a plurality of event-based gray level transition sensitive photosensing elements, and wherein said processor is operable to process data captured by said cameras to detect objects present in the fields of view of said cameras.

\* \* \* \* \*

UNITED STATES PATENT AND TRADEMARK OFFICE
CERTIFICATE OF CORRECTION

PATENT NO. : 10,356,337 B2  
APPLICATION NO. : 14/875965  
DATED : July 16, 2019  
INVENTOR(S) : Michael Biemer Page 1 of 1

It is certified that error appears in the above-identified patent and that said Letters Patent is hereby corrected as shown below:

In the Claims

<u>Column 10</u>  
Lines 59-60, Claim 9, "by said at bast one camera said plurality of cameras; and" should be --by said plurality of cameras; and--

Signed and Sealed this  
First Day of October, 2019

Andrei Iancu  
*Director of the United States Patent and Trademark Office*